(No Model.)
G. H. MALTER.
PROCESS OF AGING WINE.
No. 433,131. Patented July 29, 1890.
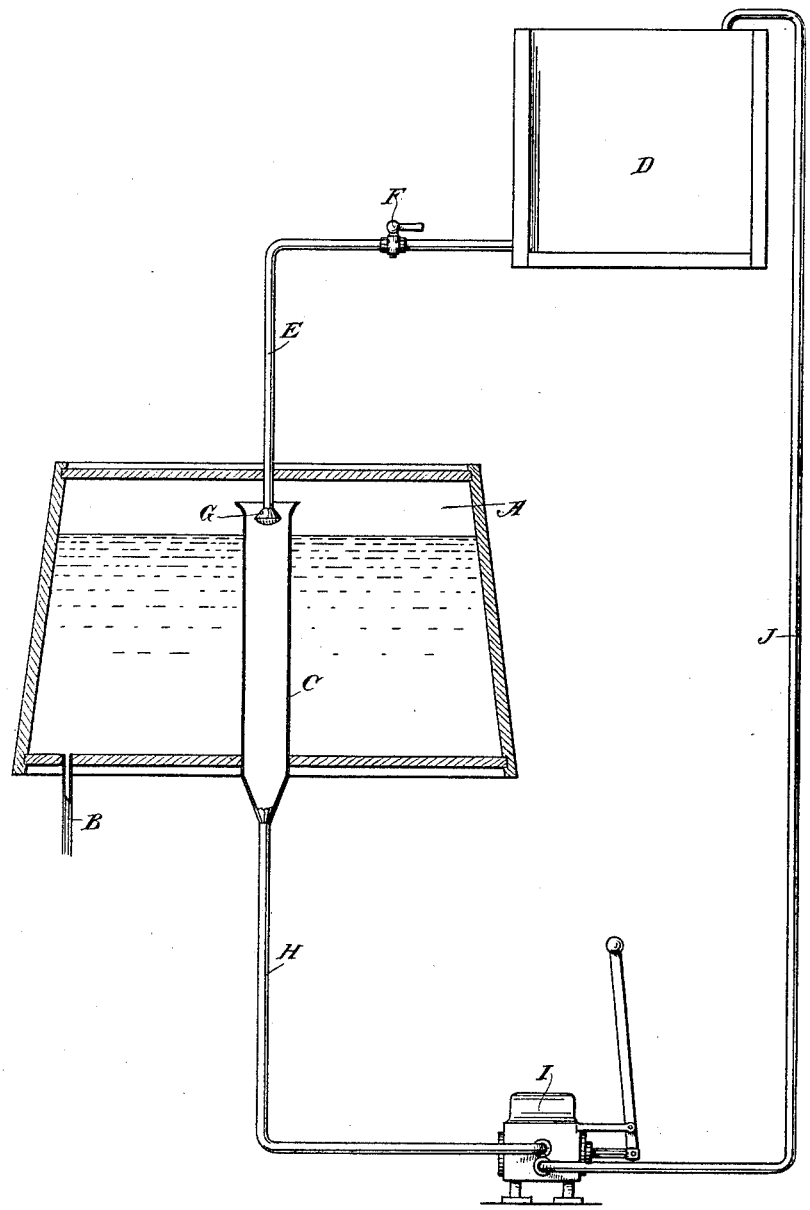

United States Patent Office.

GEORGE H. MALTER, OF SAN FRANCISCO, CALIFORNIA.

PROCESS OF AGING WINE.

SPECIFICATION forming part of Letters Patent No. 433,131, dated July 29, 1890.

Application filed February 3, 1890. Serial No. 339,070. (No model.)

*To all whom it may concern:*

Be it known that I, GEORGE H. MALTER, a citizen of the United States, residing in the city and county of San Francisco, State of California, have invented an Improvement in Process of Aging Wine; and I hereby declare the following to be a full, clear, and exact description of the same.

My invention relates to the improvement of wine; and it consists of the process hereinafter fully described and claimed.

Referring to the accompanying drawing for a more complete explanation of my invention, the figure is a sectional elevation of two tanks, showing the condensing-chamber and connecting-pipes.

A is a tank or vessel, of any suitable size, for containing a body of wine, and B is a pipe, through which steam may be introduced, so as to raise the temperature of the wine to such a degree as to vaporize the lighter and more volatile constituents of the wine. In the central portion of this tank I have shown a cylindrical chamber C fixed to the bottom of the tank and extending to a point above the surface of the contained wine. At any suitable point with relation to this tank is situated a second tank D, within which I place a body of wine which is to be improved. From this tank a pipe E leads to a point above the chamber or condenser C, and at its lower end, within the tank A and the upper part of the chamber C, is placed a rose-jet, finely perforated, so that the wine flowing from the tank D through the pipe E and suitably controlling stop-cock F will pass through the jet or sprinkler G, and will descend through the chamber C in a fine spray.

The aromatic and more volatile ingredients or constituents of the wine which is within the chamber A will be vaporized by raising the temperature of the wine, and passing into the chamber C will be condensed and unite with the spray of wine from the tank D.

It is difficult to fix any particular degree of temperature of the wine, as it must vary with the conditions. Thus if the vapors through which the wine passes are at a high temperature and the spray is small and delivered slowly the temperature will be high. If the contrary conditions exist, the temperature will be lower. I have found under ordinary circumstances that a temperature less than that of boiling water—say, from 160° to 175°—is sufficient; but I do not limit myself to such a temperature, as the same may vary to suit existing circumstances.

From the bottom of the chamber C a pipe H leads to a pump I, and a pipe J leads from this pump to the tank D, so that when the pump is in operation a continued circulation of the wine will take place. The action of the pump producing a partial vacuum in the chamber C will cause the vapors which are raised in the tank A to flow into this chamber, where they will be readily condensed by the fine spray of the wine descending through the perforated discharge-nozzle, and the action of the pump will withdraw this wine as fast as condensation takes place and return it to the tank D. By this means I am enabled to introduce the valuable aromatic and delicate flavors and other properties of the wine which is contained in the tank A into the cooler wine which is circulated through the chamber C, as above described, and to arrest all fermentation, as is necessary in making sweet wines, by killing the yeast germs in the wine, it becoming heated by contact with the vapors, thereby rendering unnecessary the use of alcoholic liquors commonly employed to arrest fermentation in sweet-wine making.

The operation may be stopped at any desired point.

Having thus described my invention, what I claim as new, and desire to secure by Letters Patent, is—

1. The process herein described for improving wine, consisting in passing the wine through vapors produced by heating another body of wine.

2. The process for improving wine, consisting in heating a body of wine within a vessel and conducting the wine to be improved through the vapors arising from the heated wine.

In witness whereof I have hereunto set my hand.

GEORGE H. MALTER.

Witnesses:
S. H. NOURSE,
H. C. LEE.